United States Patent [19]

Kreider et al.

[11] B 3,984,043

[45] Oct. 5, 1976

[54] METHOD FOR BONDING COMPOSITE MATERIALS

[75] Inventors: Kenneth G. Kreider, Glastonbury, Conn.; Roy Fanti, Springfield, Mass.

[73] Assignee: United Technologies Corporation, Hartford, Conn.

[22] Filed: May 24, 1974

[21] Appl. No.: 473,972

[44] Published under the second Trial Voluntary Protest Program on January 13, 1976 as document No. B 473,972.

Related U.S. Application Data

[63] Continuation of Ser. No. 270,124, July 10, 1972, abandoned.

[52] U.S. Cl. ............................................ 228/190
[51] Int. Cl.² .................................... B23K 31/02
[58] Field of Search ............. 29/471.1, 472.3, 494, 29/419, 423, 504

[56] References Cited
UNITED STATES PATENTS

| | | | |
|---|---|---|---|
| 3,481,023 | 12/1969 | Jost | 29/504 |
| 3,606,667 | 9/1971 | Kreider | 29/423 |
| 3,615,277 | 10/1971 | Kreider et al. | 29/472.3 |

Primary Examiner—Al Lawrence Smith
Assistant Examiner—Margaret M. Joyce
Attorney, Agent, or Firm—John D. Del Ponti

[57] ABSTRACT

A method for continuously manufacturing in air aluminum matrix composites reinforced with a plurality of parallel layers of unidirectional filaments comprising positioning a plurality of filament reinforced aluminum matrix monolayer tapes in a stack, placing the stack between platens heated to a predetermined temperature, pressing the stack between the platens at pressures of approximately 100–10,000 psi to reduce its thickness to cause densification, said temperature being lower than the liquidus temperature of the aluminum matrix but being sufficiently high, in combination with the pressure, to cause bonding of said matrix to said filaments and to contiguous portions of adjacent tapes and removing the densified composite from between the platens.

7 Claims, 1 Drawing Figure

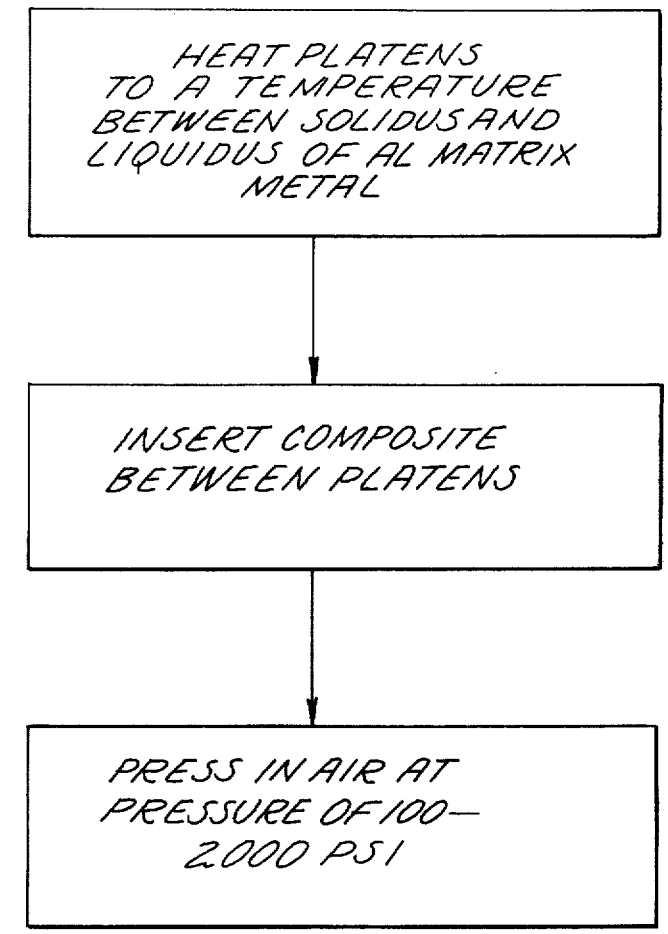

METHOD FOR BONDING COMPOSITE MATERIALS

This is a continuation of application Ser. No. 270,124, filed July 10, 1972, now abandoned.

BACKGROUND OF THE INVENTION

Conventionally, the manufacture of high modulus, high strength metal matrix composites in the aerospace industry is carried out in two major stages. In the first, monolayer tapes of high modulus, high strength brittle filaments of boron, silicon carbide or silicon carbide coated boron are sandwiched between a metal foil and a plasma sprayed metal coating, the metal being aluminum, magnesium or alloys thereof, by a winding and plasma spray operation as disclosed, for example, in U.S. Pat. No. 3,606,667 assigned to the present assignee. The second stage is the hot press diffusion bonding of multiple layers of these tapes to produce a multilayered composite. Typically, this stage requires the use of a vacuum hot press capable of providing high pressures generally in the range of 2,000–10,000 psi at elevated temperatures, usually 400°–600°C. This conventional diffusion bonding procedure requires bonding pressures in excess of 2,000 psi, a time cycle of several hours and an atmosphere of vacuum or inert gas. The lengthy time requirement is related to the practice of inserting the composite into the press prior to vacuum pump-down and heat-up and subsequent vacuum cooling after hot pressing. The heavy loading train plus dies generally require high powers and long times when they are enclosed in the vacuum system. The required time for heat-up bonding and cool-down to and from temperature, coupled with the magnitude of the pressures and temperatures needed for bonding can cause, in many cases, fiber degradation within the composite. In addition, the need for pressures on the order of 10,000 psi can unduly limit the size of the composite to be manufactured to the capacity of the hot press apparatus.

To overcome the limitations of diffusion bonding composites between fixed dies, the present invention, as described hereinafter, provides an inexpensive, essentially continuous and flexible procedure for the production of fully consolidated and bonded multilayered composites.

SUMMARY OF THE INVENTION

The present invention relates to a process for manufacturing filament reinforced composites. More particularly, it relates to a method for manufacturing high strength monolayer or multilayer metal matrix composites reinforced with a plurality of unidirectional filaments which can be done in air as an essentially continuous process.

The present invention contemplates a bonding technique comprising positioning a plurality of filament reinforced aluminum matrix tapes in a laminated stack, the tapes each comprising a plurality of unidirectional filaments embedded in a plasma sprayed aluminum matrix, placing the lamination of tapes between platens preheated to a predetermined temperature, pressing the stacked tapes between the platens at a pressure approximately 100–10,000 psi, preferably 200–5,000 psi, to reduce their thickness and cause densification, said temperature being lower than the liquidus temperature of the aluminum matrix but being sufficiently high, in combination with the pressure, to cause bonding of the matrix with the filaments and with contiguous portions of adjacent tapes and removing the densified composite from between the platens. The inventive process is particularly suited for usage as an open air continuous process wherein successive portions of the laminated tape are bonded and densified seriatim. The method is preferably performed either with the temperature maintained below the solidus with a pressure of 2,000–10,000 psi, preferably 2,000–5,000 psi, or at a temperature between the solidus and liquidus with a pressure of approximately 100–2,000 psi, preferably 500–2,000 psi.

The inventive concept is applicable to various filaments, both flexible, such as stainless steel, steel, tungsten, molybdenum and titanium, and relatively brittle, such as boron, silicon carbide, silicon carbide coated boron, boron carbide, alumina and carbon which can be embedded by plasma spraying in an aluminum matrix. Unless otherwise stated, the word used to describe the word aluminum is defined hereby to embrace both the elemental metal and its alloys. In a preferred embodiment, relatively brittle high modulus, high strength filaments such as the boron, silicon carbide and silicon carbide coated boron are embedded in the plasma sprayed aluminum which is adhered to a metal, preferably aluminum, foil. Adjacent tapes may be uniaxial with respect to each other or laid up as cross plies at various angles.

The inventive process is particularly directed toward a rapid essentially continuous method for diffusion bonding a plurality of plasma sprayed aluminum composite monolayer tapes at greater cost effectiveness than heretofore possible. As will be appreciated by those skilled in the art, the present process centers on a relatively short time of exposure of the composite to elevated temperature so that densification and bonding can be achieved at higher temperatures without fiber degradation and also with lower pressures so as to obviate the fiber crushing problem presently existing with cross-plied material and in complexly shaped parts. In general, the bonding procedure is performed in less than 40 minutes, preferably in 2–15 minutes.

DETAILED DESCRIPTION OF THE PREFERRED EMBODIMENT

According to the invention multilayer fiber reinforced composites are prepared by rapidly heating a plurality of stacked filament reinforced aluminum matrix tapes to the desired temperature. The technique requires preheating of all of the components used in the bonding process except for the workpiece. In this way, the stacked tapes are heated to the predetermined temperature and subjected to the selected pressure, generally 100–10,000 psi, for a period of time of less than 40 minutes and preferably 2–15 minutes, during which time the tapes are reduced in thickness and become densified. The temperature must be lower than the liquidus temperature of the matrix but be sufficiently high, in combination with said pressure, to cause bonding of said matrix to said filaments and to contiguous portions of adjacent tapes. It has been found that by bringing the workpiece to temperature rapidly, the need for a vacuum, or even an inert atmosphere is obviated and the process can be successfully accomplished in air in an essentially continuous manner.

In one series of experimental investigations, filament reinforced monolayer tapes were prepared by the procedures set forth in U.S. Pat. No. 3,606,667. A one mil sheet of selected aluminum foil was wound around a cylindrical mandrel and then wound over with a continuous preselected filament. The filament winding was plasma sprayed with the desired aluminum powder; the plasma sprayed layer having a porosity of approximately 15 volume percent. The resulting unconsolidated tape was approximately eleven mils thick and was cut into rectangles. A plurality of the rectangles were stacked as a lamination with all the filaments being in the same direction and with the plasma sprayed surface being mated with the foil of the adjacent tape at each interface. Of course, while the foil is considered practical to impart handleability during processing, it is possible to practice the inventive process on tapes consisting solely of the filaments embedded in a plasma sprayed matrix. The laminated composite thus formed is placed between press platens heated to a predetermined temperature and subjected to a pressure of approximately 100–10,000 psi, preferably 200–5,000 psi, therebetween to reduce the thickness of the stacked tapes until they become fully densified. The preselected temperature is always below the liquidus temperature of the plasma sprayed matrix but is sufficiently high, in combination with the pressure, to cause bonding, without fiber degradation, of the matrix to the filaments and to contiguous portions of adjacent tapes, if any. As a final step the consolidated tape portion is removed from between the platens and allowed to cool while the successive portion thereof is inserted between the platens and pressed. The temperature of the platens is preferably maintained below the solidus of the matrix with high pressures of 2,000–10,000 psi, preferably 2,000–5,000 psi or alternatively, between the solidus and liquidus with pressures of 100–2,000 psi, preferably 500–2,000 psi.

More specifically, tapes comprising 5.7 mil silicon carbide coated boron filaments (commercially available from Hamilton Standard Division of United Aircraft Corporation) embedded in approximately four mils of plasma sprayed 6061 aluminum alloy on a one mil 6061 aluminum alloy foil were prepared according to the technique set forth in the above referenced U.S. Pat. No. 3,606,667. The tapes had a density of 0.254 to 0.306 grams/inch$^2$, an extracted fiber UTS of 420–479 $10^3$ psi and a fiber spacing of 139–144 fibers/inch. The tapes were cut into 2 × 6 inch and 2 × 5 inch strips and were laminated six or seven layers thick. A single additional layer of foil was added to each stack to assure the presence of foil on both composite surfaces and between each layer of fiber. The stacked tapes were then hot pressed under the conditions shown below. Closed dies were not used in order that translational motion of the composite material between the platens was possible and continuous shapes could be fabricated.

Two hot presses were used to perform the bonding. One was a small hand pump press capable of applying a maximum force of 20,000 pounds. This apparatus was used to fabricate most of the composites tested. Additionally, a large kiloton press capable of 4 × 10$^6$ pounds of force was also used to fabricate the panels at pressures in excess of the capacity of the smaller hand press. Both presses were equipped with platens having internal resistance heatings. The particular hot press procedure utilized comprised the steps of: (1) heating the hot press platens to the desired temperature for hot pressing; (2) inserting the stack of aligned tape layers between the platens and closing the platens to make contact with the tape layers at a slight pressure (less than 200 psi); (3) waiting a short period, usually two minutes, for the hot press to regain bonding temperature level; (4) applying desired pressure for the bonding time required; and (5) releasing pressure, translating the workpiece and repeating steps (2) through (4).

The composite panels produced by this procedure were cooled in air and cut using an abrasive wheel to provide both axial and transverse tensile specimens. The specimens were parallel sided with aluminum doublers bonded for gripping. Strain gages were bonded on some of the specimens to determine elastic modulus, however, in most cases only the composite ultimate tensile strengths were measured.

Results of the panels fabricated according to the present technique are shown in the following table.

Table 1

| | Composites Fabricated in Air | | | | | | | Extracted |
|---|---|---|---|---|---|---|---|---|
| Example | Temp (°C) | Pressure (psi) | Time (min) | No. of Tapes | 0° UTS (psi) | 90° UTS (psi) | V/O Fiber | Fiber UTS $10^3$ psi |
| 1 | 614–622 | 500 | 2 | 7 | 182,000 179,000 | 7,250 10,600 | 49 | — |
| 2 | 617–623 | 500 | 10 | 7 | 202,000 190,000 | 6,400 3,380 | 51 | 428 |
| 3 | 618–624 | 1000 | 2 | 7 | 206,000 193,000 | 10,680 15,700 | 53 | 443 |
| 4 | 618–627 | 500 | 40 | 7 | 144,000 149,000 | 10,520 11,400 | 47 | 391 |
| 5 | 621–624 | 1000 | 2 | 7 | 203,000 181,000 | 13,600 14,300 | 53 | — |
| 6 | 626–635 | 200 | 10 | 7 | 160,000 144,300 | * * | 47 | 430 |
| 7 | 625–632 | 500 | 10 | 7 | 162,500 151,000 | 7,370 9,420 | 53 | — |
| 8 | 626–634 | 200 | 40 | 7 | 120,000 164,500 | 3,095 1,860 | 49 | 433 |
| 9 | 626–632 | 1000 | 2 | 7 | 184,500 164,000 | 14,720 13,100 | 53 | — |
| 10 | 629–632 | 500 | 2 | 7 | 183,000 171,000 | 5,800 4,200 | 50 | 416 |
| 11 | 630–634 | 200 | 2 | 7 | 185,000 193,700 | 3,750 4,250 | 51 | — |
| 12 | 631–636 | 200 | 2 | 7 | 154,000 147,000 | 6,520 6,000 | 45 | — |
| 13 | 619–625 | 1000 | 2 | 6 | 202,500 199,100 | 7,900 9,000 | 62 | — |
| 14 | 618–620 | 500 | 10 | 6 | 175,000 183,000 | 12,700 12,500 | 52 | — |

Table I-continued

Composites Fabricated in Air

| Example | Temp (°C) | Pressure (psi) | Time (min) | No. of Tapes | 0° UTS (psi) | 90° UTS (psi) | V/O Fiber | Extracted Fiber UTS 10³ psi |
|---|---|---|---|---|---|---|---|---|
| 15 | 620–621 | 500 | 2 | 6 | 190,000 / 183,000 | 8,200 / 10,900 | 51 | — |
| 16 | 628–631 | 500 | 2 | 6 | 172,000 / 167,000 | 6,100 / 3,200 | 56 | — |
| 17 | 628–631 | 200 | 2 | 6 | 171,000 / 173,000 | 5,300 / 6,500 | 56 | — |
| 18 | 630–633 | 500 | 10 | 6 | 165,000 / 171,000 | 12,400 / 12,600 | 63 | — |
| 19 | 630–632 | 1000 | 2 | 6 | 168,500 / 175,000 | 15,800 / 17,800 | 58 | — |
| 20 | 630–631 | 1000 | 2 | 6 | — / — | 13,600 / 12,100 | — | — |
| 21 | 630–632 | 1000 | 6 | 6 | 188,000 / 172,000 | 17,900 / 15,700 | 61 | — |
| 22 | 629–632 | 1000 | 10 | 6 | 161,000 / 173,000 | 16,600 / 12,600 | 61 | — |
| 23 | 630–631 | 2000 | 2 | 6 | 169,000 / 178,000 | 18,600 / 17,500 | 62 | — |

*Specimens were too weak to test

As indicated in Table I, the temperatures for hot pressing were chosen to be between the solidus and liquidus temperature of the 6061 aluminum alloy. The solidus temperature of 6061 aluminum is 582°C and the liquidus is 652°C. Several combinations of temperature, 620°–630°C, pressure, 500–1,000 psi, and time, 2–10 minutes, produced average composite axial tensile strengths in excess of 180,000 psi for filament contents of approximately 50 volume percent. In addition, it can be seen that bonding at temperatures in excess of 630°C for 10 minutes or more can cause a decrease in axial tensile strength to well below 180,000 psi. It is believed that this decrease is due to filament degradation.

Microstructural examination of specimens removed from Examples 13–23 revealed that almost all panels were fully consolidated and had good microstructures. Those panels exhibiting the lowest transverse tensile strength values were not fully consolidated. Further tests were performed under two sets of conditions. The conditions chosen were (1) temperatures of 618°–625°C, pressures of 1,000 psi, and a time of two minutes and (2) 618°–625°C, 500 psi, 10 minutes. Bonding at 1,000 psi resulted in an average axial strength of 189,000 psi for an average filament content of 52 percent by volume; the range of values being from 163,000 to 206,000 psi. The axial tensile strength generally increased with increasing fiber volume fraction. Bonding at 500 psi resulted in lower axial strength composites with the range of values being from 159,000 to 192,000 psi.

In addition to the above examples, further experiments were conducted utilizing various aluminum-copper, aluminum-magnesium and aluminum-magnesium-silicon alloys as set forth in Table II.

Table II

Composite Properties

| Example | Vol. % Fiber | Matrix Alloy | Fiber | Temperature | Time (min.) | Pressure (psi) | UTS 10³ psi |
|---|---|---|---|---|---|---|---|
| 24 | 43 | 2024 | Boron | 550°C | 2 | 500 | 167 (16 at 90°) to fiber |
| 25 | 44 | 6061 | BORSIC | 620°C | 2 | 500 | 153 |
| 26 | 41 | 5056 | BORSIC | 565°C | 2 | 500 | 138 |
| 27 | 49 | Al+8%Mg | BORSIC | 600°C | 2 | 500 | 180 |
| 28 | 46–55 | 6061 | BORSIC | 620°C | 2 | 1000 | 163–206 (20 values) |
| 29 | 50–58 | 6061 | BORSIC | 630°C | 10 | 500 | 159–192 (10 values) |
| 30 | 60 | 6061 | BORSIC | 600°C | 15 | 2000 | 220; 238 |
| 31 | 56 | 6061 | BORSIC (All above pressed in Air) | 570°C | 15 | 2000 | 212; 214 |
| 32 | 56–58 | 6061 | (All above pressed in Air) | 600°C | 15 | 2000 | 216; 220 |
| 33 | 58 | 6061 | (All above pressed in Air) (Pressed in Argon Can) | 570°C | 15 | 2000 | 219; 227 |

Additional investigations were conducted utilizing temperatures very near the solidus temperature of 6061 aluminum (582°C) using the insertion into and extraction from hot dies. This fast time cycle was used with pressures of 2,000 and 5,000 psi. The results of these bonding experiments are presented in Table III.

Table III

| Example | Temp (°C) | Atmosphere | Composite Properties Pressure (psi) | Time (min) | V/O Fiber | 0° UTS (psi) | 90° UTS (psi) |
|---|---|---|---|---|---|---|---|
| 34 | 600 | Argon | 5000 | 15 | 56 | 254,000 | 23,000 |
|    |     | Sen Pak |    |    |    | 275,000 | 21,800 |
| 35 | 600 | Argon | 5000 | 15 | 56 | 209,000 | 22,800 |
|    |     | Sen Pak |    |    |    | 212,000 | 20,200 |
| 36 | 600 | Argon | 5000 | 15 | 57 | 223,000 | 21,600 |
|    |     | Sen Pak |    |    |    | 217,000 | 23,200 |
| 37 | 600 | Argon | 5000 | 60 | 58 | 208,000 | 21,600 |
|    |     | Sen Pak |    |    |    | 184,000 | 27,000 |
| 38 | 600 | Argon | 2000 | 15 | 56 | 216,000 | 23,400 |
|    |     | Sen Pak |    |    |    | 222,000 | 24,800 |
| 39 | 600 | Argon | 2000 | 60 | — | — | — |
|    |     | Sen Pak |    |    |    | — | — |
| 40 | 600 | Air | 2000 | 15 | — | 238,000 | 12,000 |
|    |     |     |    |    |    | 220,000 | 11,000 |
| 41 | 570 | Argon | 5000 | 15 | 57 | 228,000 | 22,700 |
|    |     | Sen pak |    |    |    | 222,000 | 22,800 |
| 42 | 570 | Argon | 2000 | 15 | 58 | 227,000 | 20,100 |
|    |     | Sen Pak |    |    |    | 219,000 | 21,800 |
| 43 | 570 | Air | 5000 | 15 | 58 | 216,000 | 19,300 |
|    |     |     |    |    |    | 222,000 | 22,700 |
| 44 | 570 | Air | 2000 | 15 | 56 | 214,000 | 18,900 |
|    |     |     |    |    |    | 212,000 | 20,100 |

At a temperature of 600°C, it can be seen that excellent axial and transverse strengths are obtained with all bonding parameters used if an argon atmosphere is used with the canned specimen. A pressure of 2,000 psi for 15 minutes results in excellent properties including transverse tensile strengths well in excess of 20,000 psi, although bonding in air causes a significant decrease in the transverse strength. At 570°C, it can be seen that advanced diffusion bonding in the solid state at pressures of 2,000 and 5,000 psi both result in excellent strength in both the axial and transverse directions. In addition, either argon or air can be used to achieve similar strength levels, although argon may produce slightly better results in 90° strength. Overall, the large variation throughout the examples in transverse tensile strengths obtained is primarily due to variations in degree of composite consolidation and matrix condition. This can, of course, be related in turn to the tape flaws.

By way of summary, it can be seen that the present diffusion bonding technique is capable of providing high strength filament reinforced aluminum matrix composites. A range of pressures, temperatures and bonding times have been investigated and each of these combinations has something to offer; i.e., low pressure and ease of fabrication, high axial tensile strength, high axial transverse tensile strength and the combinations of these features. The fabricator can choose a balance of these factors to suit his own particular needs. Fabricating in air, has been shown to be satisfactory, although some variability in transverse properties at the lower pressures may be introduced. For this reason, the use of temperatures below the solidus to achieve a solid state bond are preferred. In this regard, although temperatures as much as approximately 100°C or more below the solidus could be used, for economic reasons the temperature should be kept to not more than approximately 25° therebelow. Pressures of 2,000 psi were used in order to obtain the highest transverse strengths and this pressure was adequate at 600°C up to 630°C. Consistently high axial strengths were produced under all conditions except temperatures above 630°C for 15 minutes or 620°C for 40 minutes. In this latter case some 20 percent fiber degradation resulted.

What has been set forth above is intended primarily as exemplary to enable those skilled in the art and the practice of the invention and it should therefore be understood that, within the scope of the appended claims, the invention may be practiced in other ways than as specifically described.

What is claimed is:

1. A process for rapidly densifying and diffusion bonding plasma sprayed aluminum matrix composites reinforced with a plurality of filaments comprising placing at least one composite tape having a plurality of unidirectional filaments selected from the group consisting of boron, silicon carbide, silicon carbide coated boron, boron carbide, alumina and carbon embedded in a plasma sprayed aluminum matrix between platens heated to a predetermined temperature, pressing said composite in air for 2–40 minutes between said heated platens at a pressure of 100–10,000 psi to densify said aluminum matrix, said temperature being at or below the solidus temperature of said aluminum matrix when said pressure is 2,000–10,000 psi and between the solidus and the liquidus temperature of said aluminum matrix when said pressure is 100–2,000 psi, said temperature and pressing time being sufficiently high, in combination with said pressure, to cause bonding of the aluminum matrix to said filaments without degradation.

2. The process of claim 1 wherein there are at least two tapes and said aluminum matrix is also caused to bond to contiguous portions of adjacent tapes.

3. A method for rapidly manufacturing high strength aluminum matrix composites reinforced with a plurality of parallel layers of filaments comprising:

positioning a plurality of filament reinforced aluminum matrix tapes in a stack, each tape comprising a plurality of unidirectional filaments selected from the group consisting of boron, silicon carbide, silicon carbide coated boron, boron carbide, alumina and carbon embedded in a plasma sprayed aluminum matrix;

heating hot press platens to a predetermined temperature;

placing said stacked tapes between said platens;

pressing said tapes in air for approximately 2–15 minutes between said platens at a pressure of 100–10,000 psi to reduce their thickness and cause densification, said temperature being at or below the solidus temperature of said aluminum matrix when said pressure is 2,000–10,000 psi and between the solidus and the liquidus temperature of said aluminum matrix when said pressure is 100–2,000 psi, said temperature and pressing time being sufficiently high, in combination with said pressure, to cause bonding of said matrix to said filaments and to contiguous portions of adjacent tapes without filament degradation; and removing said densified composites from between said platens.

4. The invention of claim 3 wherein said stacked tapes are pressed after reaching said platen temperature.

5. The invention of claim 3 wherein said platens are heated to a temperature which is below the solidus temperature by not more than 25°C when said pressure is 2,000–10,000 psi.

6. A method for rapidly manufacturing high strength 6061 aluminum matrix composites reinforced with a plurality of parallel layers of unidirectional filaments selected from the group consisting of boron, silicon carbide coated boron and silicon carbide filaments comprising:

positioning a plurality of filament reinforced aluminum matrix tapes in a stack, said tapes comprising a plurality of unidirectional filaments embedded in a plasma sprayed 6061 aluminum matrix;

placing said stacked tapes between platens heated to a temperature of approximately 570°–635°C;

pressing said tapes in air for approximately 2–15 minutes between said platens at a pressure of 200–5,000 psi to reduce their thickness until fully densified, said temperature being 570°–582°C when said pressure is 2,000–5,000 psi and 582°–635°C when said pressure is 200–2,000 psi, said temperature and pressing time being sufficiently high, in combination with said pressure, to cause bonding of said matrix to said filaments and to contiguous portions of adjacent tapes without filament degradation; and removing said densified composites from between platens.

7. The invention of claim 6 wherein said temperature is approximately 600°–630°C and the pressure is 500–2,000 psi.

* * * * *